(12) United States Patent
Dixon

(10) Patent No.: US 12,156,615 B2
(45) Date of Patent: Dec. 3, 2024

(54) INTERCHANGEABLE TILE SYSTEM FOR COOKING MOLD

(71) Applicant: Lorin Dixon, Greensboro, NC (US)

(72) Inventor: Lorin Dixon, Greensboro, NC (US)

( * ) Notice: Subject to any disclaimer, the term of this patent is extended or adjusted under 35 U.S.C. 154(b) by 834 days.

(21) Appl. No.: 17/181,446

(22) Filed: Feb. 22, 2021

(65) Prior Publication Data
US 2021/0259473 A1 Aug. 26, 2021

Related U.S. Application Data

(60) Provisional application No. 62/980,544, filed on Feb. 24, 2020.

(51) Int. Cl.
| | |
|---|---|
| A47J 43/20 | (2006.01) |
| A23P 30/10 | (2016.01) |
| A47J 9/00 | (2006.01) |
| B29C 33/30 | (2006.01) |

(52) U.S. Cl.
CPC ............... *A47J 43/20* (2013.01); *A23P 30/10* (2016.08); *A47J 9/007* (2013.01); *B29C 33/301* (2013.01)

(58) Field of Classification Search
CPC . A47J 43/20; A47J 9/007; A23P 10/10; A23P 30/10; B29C 33/301; B29C 33/0088; B29C 65/70; A21D 13/47; A21D 13/44
USPC ........................... 99/388, 426, 428, 432, 433
See application file for complete search history.

(56) References Cited

U.S. PATENT DOCUMENTS

| | | | | |
|---|---|---|---|---|
| 2,529,354 | A * | 11/1950 | Schroeder | A21B 3/13 |
| | | | | D7/672 |
| 3,780,978 | A * | 12/1973 | Proul | A47J 37/108 |
| | | | | D7/672 |
| 4,656,927 | A * | 4/1987 | Mosby | A47J 37/0892 |
| | | | | 99/402 |
| 5,156,637 | A * | 10/1992 | Wai-Ching | A47J 37/0892 |
| | | | | 99/402 |
| 5,453,287 | A * | 9/1995 | Close | B28B 7/346 |
| | | | | 249/DIG. 1 |
| 6,827,324 | B1 * | 12/2004 | Yother | A21B 3/13 |
| | | | | 99/428 |
| 11,472,066 | B2 * | 10/2022 | Moll | B29C 64/40 |
| 2006/0180033 | A1 * | 8/2006 | Pan | A47J 37/0892 |
| | | | | 99/388 |
| 2018/0289211 | A1 | 10/2018 | Daniels et al. | |
| 2020/0205616 | A1 * | 7/2020 | Scharf | A21D 13/48 |

* cited by examiner

*Primary Examiner* — Reginald Alexander
(74) *Attorney, Agent, or Firm* — Carlson, Gaskey & Olds, P.C.

(57) ABSTRACT

A cooking mold assembly for making shaped pancakes and other food items is disclosed and includes a main body portion with an outer peripheral wall for holding uncooked batter. The main body portion has at least one character opening for a character tile. The character tile and a front face of the main body portion define a pattern that is formed in the completed food item. The character tile may be exchanged to tailor the design formed in the food item as desired. A back surface of the main body portion includes a textured surface to inhibit sticking to a hot cooking surface.

14 Claims, 9 Drawing Sheets

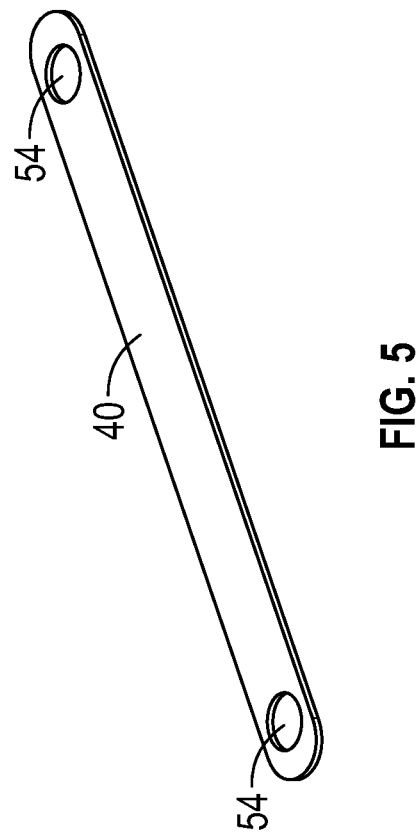
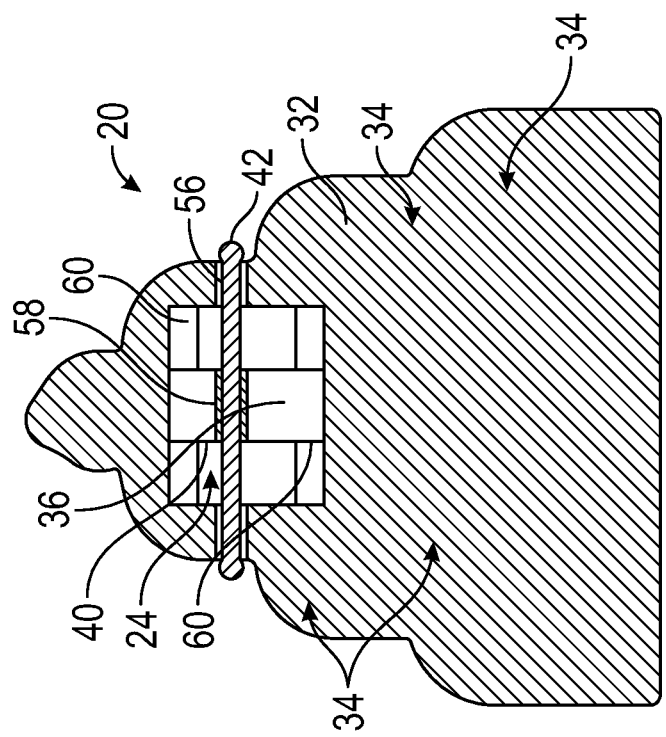

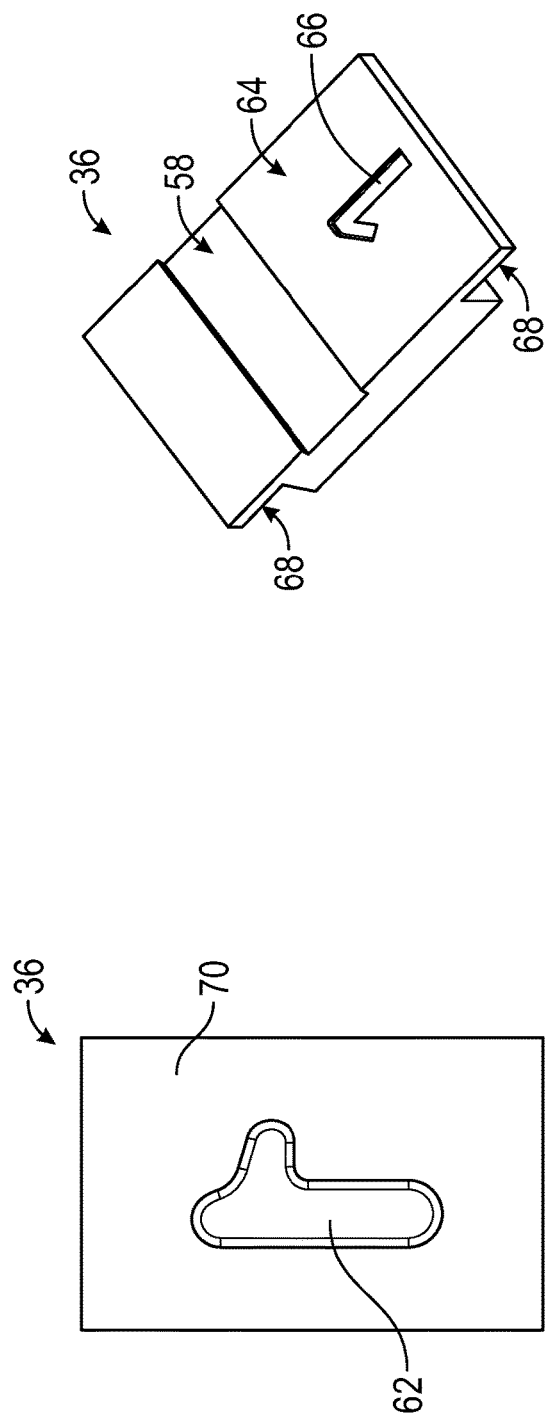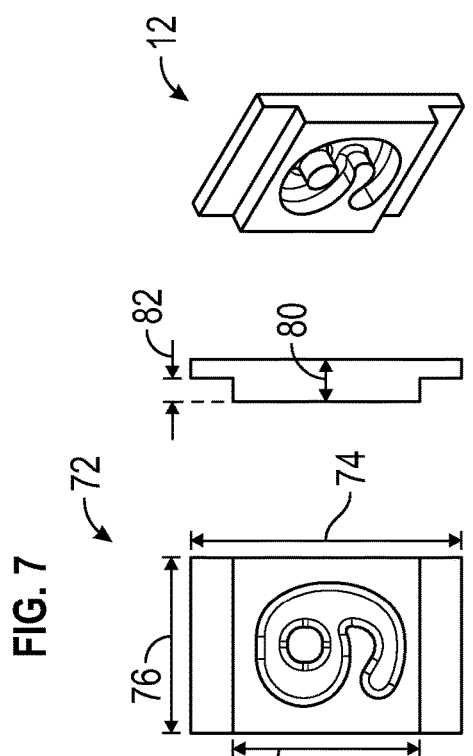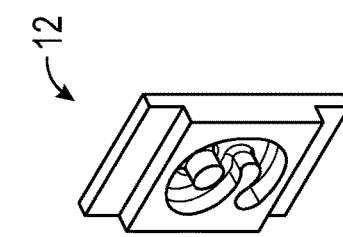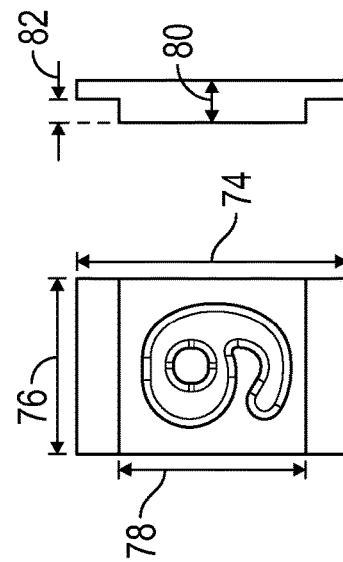

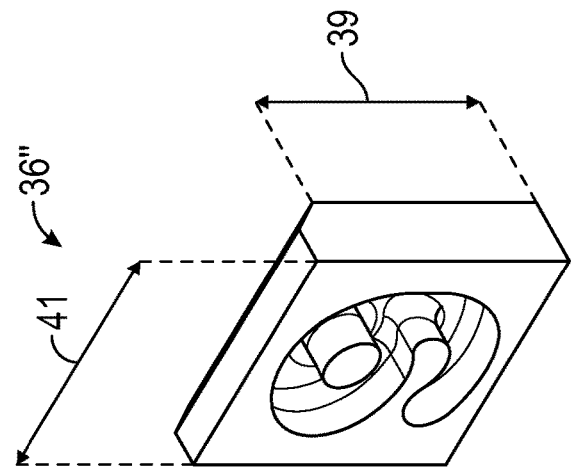
FIG. 20
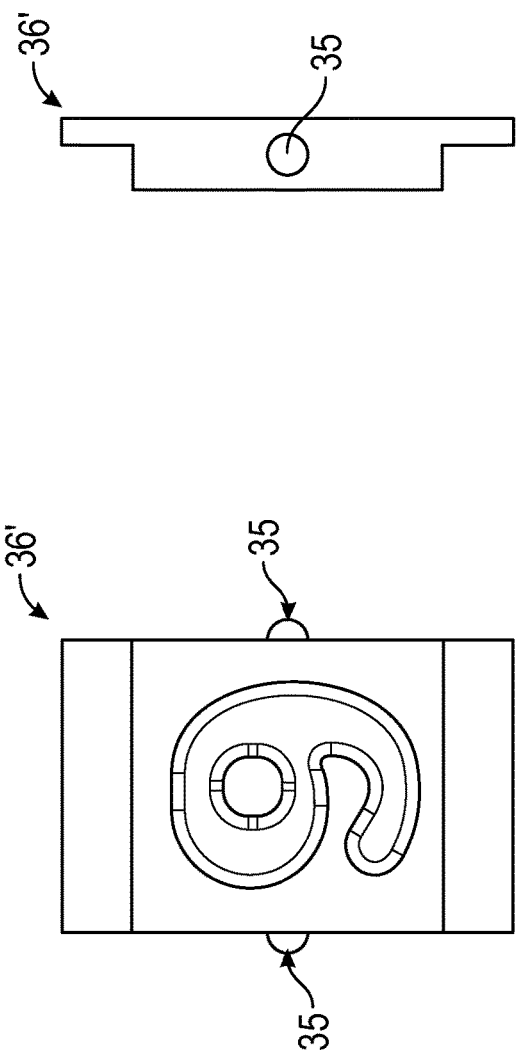
FIG. 18
FIG. 17
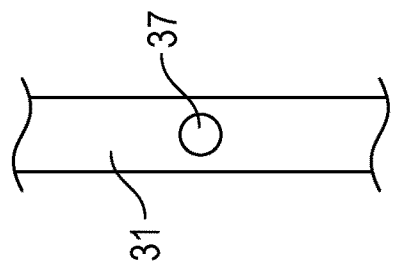
FIG. 19

INTERCHANGEABLE TILE SYSTEM FOR COOKING MOLD

CROSS REFERENCE TO RELATED APPLICATION

This application claims priority to U.S. Provisional Application No. 62/980,544 filed on Feb. 24, 2020.

TECHNICAL FIELD

The present disclosure relates to a device utilized in the preparation of a food item, and more specifically a mold for imprinting a design, symbol or character onto a prepared food item.

BACKGROUND

Cooking molds are utilized to define and/or imprint a shape of a cooked item such as a cake, candy, and other food items. Molds for pancakes may also be utilized to provide a unique shape to a completed pancake. Molds define a general outline and/or shape of the cooked item. Molds are typically configured to provide a single shape and form and therefore many molds are needed. Additionally, a mold may only be appropriate for a single use for a single occasion.

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A food mold assembly according to a disclosed example embodiment includes, among other possible things, a main body portion defining at least one character opening and a shape of completed food item and at least one character tile configured to fit within the at least one character opening, the at least one character tile including a character face configured to define a portion of the completed food item.

A toast mold assembly according to another disclosed example embodiment includes, among other possible things, an outer peripheral wall for holding a food item and a design secured to the outer peripheral wall over a space for holding the food item, the design configured to block heat applied to the food item in a non-uniform manner across at least one surface of the food item to form a visible design in the food item.

A food preparation mold assembly according to another disclosed example embodiment includes, among other possible things, a main body portion including an outer peripheral wall, a back face and at least one character opening, the outer peripheral wall configured to define a shape of completed food item, wherein the back face includes a textured surface and at least one character tile configured to fit within the at least one character opening, the at least one character tile including a front face configured to define a character in the completed food item.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 4 is a back view of the birthday cake shaped pancake mold.
FIG. 5 is a perspective view of an example rope for holding tiles within the birthday cake shaped pancake mold.
FIG. 6 is a front view of an example character tile.
FIG. 7 is a rear perspective view of the example character tile.
FIG. 8 is a side perspective view of the example character tile.
FIG. 9 is a front view of another example character tile.
FIG. 10 is a side view of the example character tile.
FIG. 11 is a perspective view of the example character tile.
FIG. 17 is front view of another example tile embodiment.
FIG. 18 is a side view of the example tile embodiment shown in FIG. 17.
FIG. 19 is a schematic view of a portion of a side wall of an opening of the birthday cake shaped mold.
FIG. 20 is another example tile embodiment.

DETAILED DESCRIPTION

Figure 1:
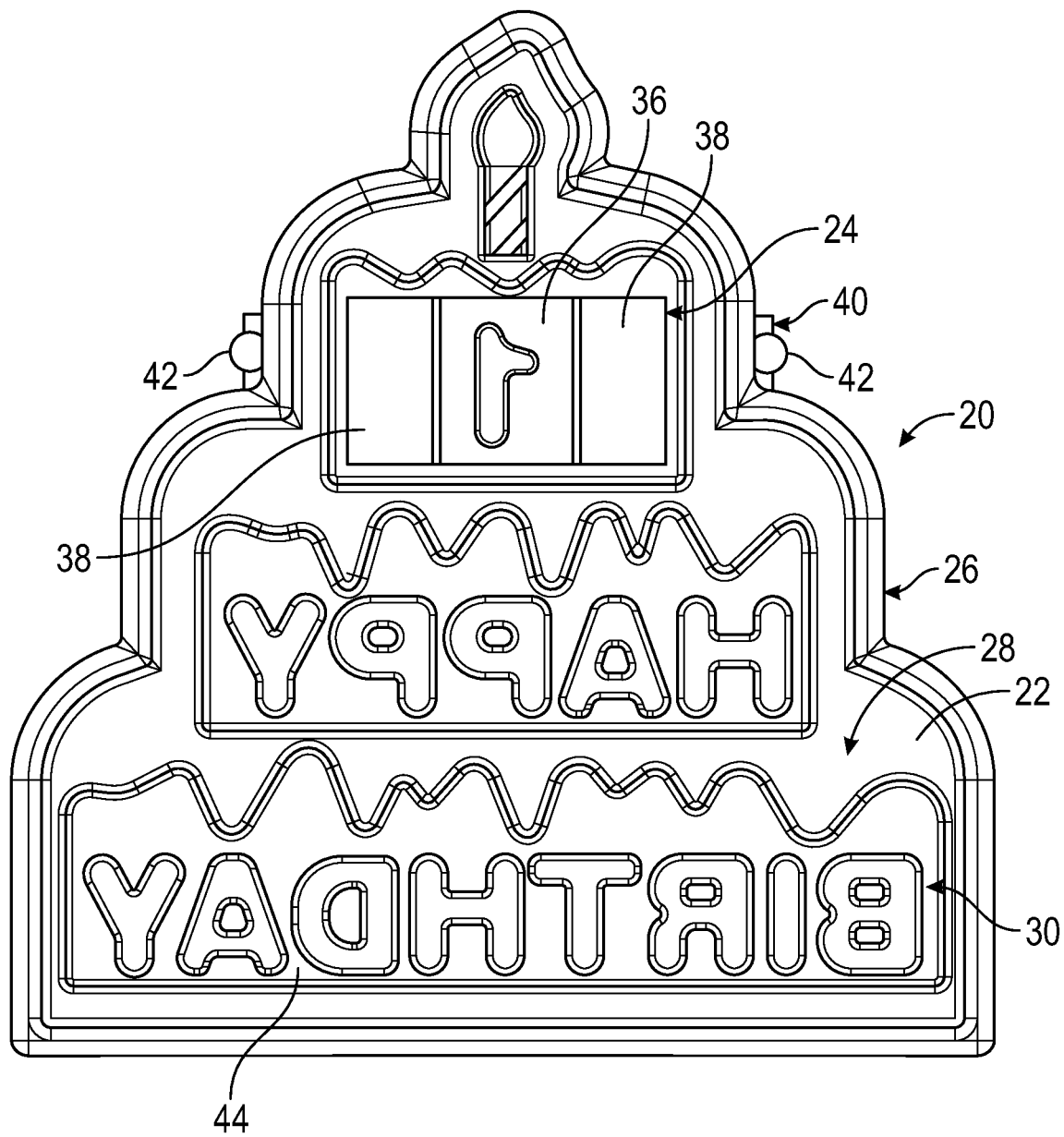
FIG. 1 is a front view of an example birthday cake shaped pancake mold embodiment.
Figure 3:
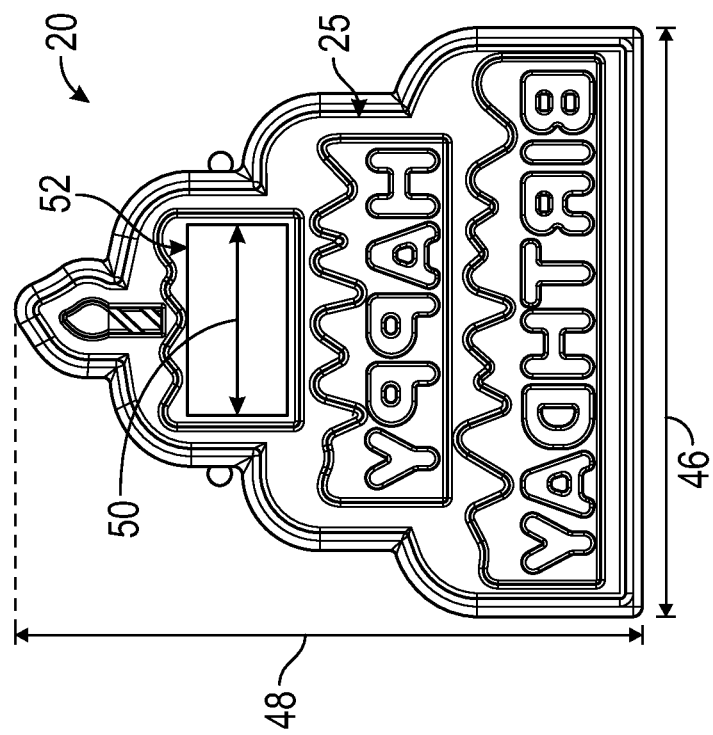
FIG. 3 is another front view of the birthday cake shaped pancake mold.

Referring to FIG. 1, an example mold for preparing and shaping a cooked item is indicated at 20. The example mold is a birthday cake shaped pancake mold with an opening 24 for tiles with a various numerals, letters and/or other characters. In this example, a character tile 36 with a number "1" is shown between two blank tiles 38. The character tiles 36 and blank tiles 38 are removable and changeable to enable any number, saying or arrangement of symbols to be imprinted within a cooked item.

In this example, the cooked item is a pancake and the completed pancake would be shaped like a birthday cake and have the cooked in impression of the phrase "HAPPY BIRTHDAY" along with the number 1. It should be appreciated that although the disclosed mold is birthday cake shaped other shapes and sayings are within the contemplation and scope of this disclosure. The cake may include sayings and phrases that are appropriate for other occasions such as weddings, anniversaries, and retirements.

Moreover, although the example mold is disclosed by way of example for the preparation of a pancake, the disclosed molds may also be utilized for the preparation of other food items. For example, the example mold could be utilized to prepare, pizza, sushi, hash-browns, cookies, Rice Krispies, crapes, brownies, ice, ice cream, no-bake food items, pies, breads, quesadillas, donuts along with any other food item that may be formed into a unique shape. The specific food item shaped with the example mold is limited only by a one's imagination.

The example mold includes the changeable tiles to enable use for multiple different birthdays by changing the character tile 36. Additionally, the character tile can be combined with other character tiles to provide double digit ages. Moreover, tiles with names could also be utilized and are within the contemplation and scope of this disclosure.

A peripheral wall 26 surrounds a base surface 28 and holds pancake batter within the mold 20. The base surface 28 includes raised portions 44 that define the design and letters spelling out "HAPPY BIRTHDAY.' The letters for the phrase are provided as a mirror image in order to allow the phrase to be correctly shown in the completed pancake.

The example mold 20 is formed from a flexible silicon material that is capable of enduring heat during cooking. To form a shape, the mold is placed onto a hot cooking surface such as pan or griddle. The mold may also be placed within other cooking appliances including an oven, microwave and/or air fryer. Additionally, the mold may also be utilized with food items that are not cooked, such as gelatin that are prepared by being chilled in a freezer or refrigerator.

Figure 2:
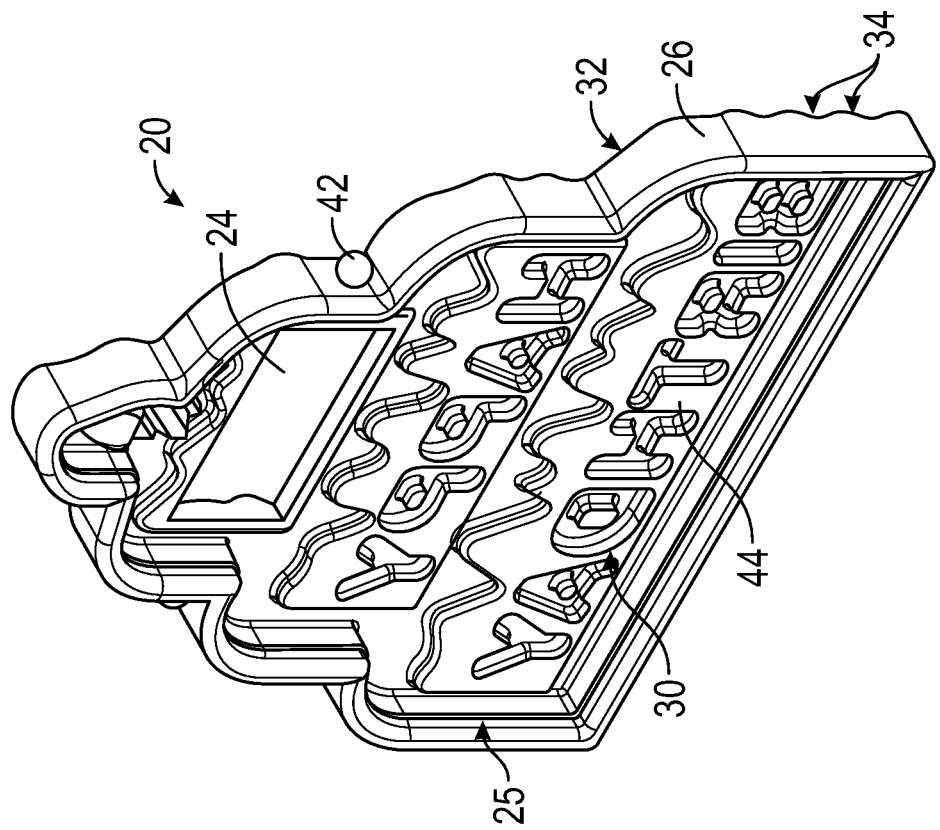
FIG. 2 is a perspective view of the example birthday cake shaped pancake mold embodiment.

In the disclosed example, the mold 20 is filled with pancake batter up to a fill line 25 (Shown in FIG. 2) or the top of the peripheral wall 26. The batter rests on the base surface 28 and allowed to cook for a period of time sufficient to at least partially solidify the batter. Heat radiates through the base surface 28 to cook the surface of the pancake that includes the phrase. Once sufficiently solidified, the mold 20 is flipped over in the pan or griddle and removed. The impression formed by the peripheral wall 26 and the indentations 44 are left shown in the face of the pancake. The back side of the pancake may then be cooked as desired until complete. The completed pancake will have the impression of the phrase as well as the character 36. The phase and the character will be raises surfaces on the completed pancake.

Referring to FIGS. 2, 3, 4 and 5 with continued reference to FIG. 1, the tiles 36, 38 are at least partially held in place by at least one rope 40 that is attached to attachment balls 42 on either side of the mold 20. Although, one rope 40 is shown by way of example, additional ropes 40 could be utilized and are within the contemplation of this disclosure.

The rope 40 extends between sides of the mold 20 and over a back side of the tile 38. Note that in FIG. 4, only the tile 38 is shown in order to show slots 60 on top and bottom sides of the opening 24. The tile 38 includes corresponding lips 68 (Shown in FIGS. 7 and 8) that fit into the slots 60. The slot 60 and lip 68 configuration maintains an alignment of the tile 36 within the opening 24. Moreover, the example tile includes a groove 58 that aligns with a groove 56 in the back face 32. The grooves 58 and 56 receive the rope 40 that extends between the balls 42 to hole the tile 36 in place. The disclosed rope 40 is substantially flat and fits within the grooves 58, 56 to provide an even and uniformly back surface 32 to provide the uniform communication of heat through mold to provide uniform cooking of batter. The rope 40 includes openings 54 that fit onto balls 42 to hold the rope 40 in place. The openings 54 are less than a maximum width or diameter of the ball 42 to assure the rope 40 is held in place. The rope 40 is made of flexible and expandable silicon material. The flexible material enables the openings 54 to stretch open for assembly onto the corresponding ball 42.

The disclosed rope 40 is shown by way of example and could be round, oval or shaped other than flat. Moreover, although a rope is disclosed by way of example, other means for holding the tiles 36 in place could be utilized and are within the contemplation and scope of this disclosure. Additionally, in some applications and uses, the tiles 36 may remain in place without additional attachment features by an interference fit, or other integral means and/or configuration.

The mold 20 includes a width 46 and height 48 that are sized to fit within commonly used pans and griddles. As appreciated, the exact width 46 and height 48 may differ to scale the mold for use with differently sized pans and griddles.

A back face 32 of the mold 20 includes a textured surface 34. The textured surface 34 may be a series of ribs, serrations or any other structures. The texture surface 34 prevents the mold 20 from sticking to a cooking surface. Moreover, the textured surface provides for a uniform distribution of heat to provide a uniform application of heat to batter within the mold 20.

Referring to FIGS. 6, 7 and 8 with continued reference to FIG. 4, the example character tile 36 is shown separate from the mold 20. The tile includes an impression 62 that is shaped into a mirror image of the number "1." The impression fills with batter during cooking and provides a raised surface in the completed cooked item. The tile 36 includes a flat front face 70 that substantially matches the base surface 28 when assembled into the mold 20. It should be appreciated, that the number "1" is shown by way of example and that tiles with other numbers, letters, words, names, sayings and characters could be utilized and are within the contemplation and scope of this disclosure.

The example tile includes a back face 64 that includes an impression 66 of the numeral formed on the front face 70. The impression 66 is provided in correct non-mirrored form to enable a user to identify and arrange tiles from the back face 32 of the mold 20. In this example, the number "1" is provide in correct form to identify the tile from the back side during assembly. The back face 64 further includes the groove 58 for the rope 40.

The tile 36 includes lips 68 that extend outward from a main body portion. The lips 68 fit within the slots 60 (FIG. 4) formed on the back side 32 of the mold 20. The lips 68 are rectangular and provide for alignment within the opening 24. It should be appreciated, that the lips 68 may be shaped differently to provide the desired alignment within the opening 24. Moreover, although the rope 40 is disclosed by way of example for holding the tiles 36, 38 in place, other means and ways of holding the tiles 36, 38 in place could be utilized and are within the scope and contemplation of this disclosure.

Referring to FIGS. 9, 10 and 11, another tile 72 is shown. The tile 72 provides for the creation of the number "9" in the completed pancake. The tile 72 includes a height 74 and width 76 that correspond with the opening 24. The height 74 is equal to or less than the height 52 (FIG. 3) of the opening 24. The width 76 is less than that of the opening in this example. However, the width 76 may be substantially the same width of the opening 24 to eliminate the need for blank tiles 38. The tiles 72 includes a first thickness 80 that is the same as or equal to a thickness of the base surface 28 of the mold 20. The first thickness 80 provides for the number or character on the tile 72 to be even with other designs or characters formed on the front face 30. A second thickness 82 is provided at each of the lips 68. The second thickness 82 is less than the first thickness 80. The thickness 82 of the lips 68 provides for the back surface 64 to set substantially flush with the back side 32 of the mold 20.

Figure 13:
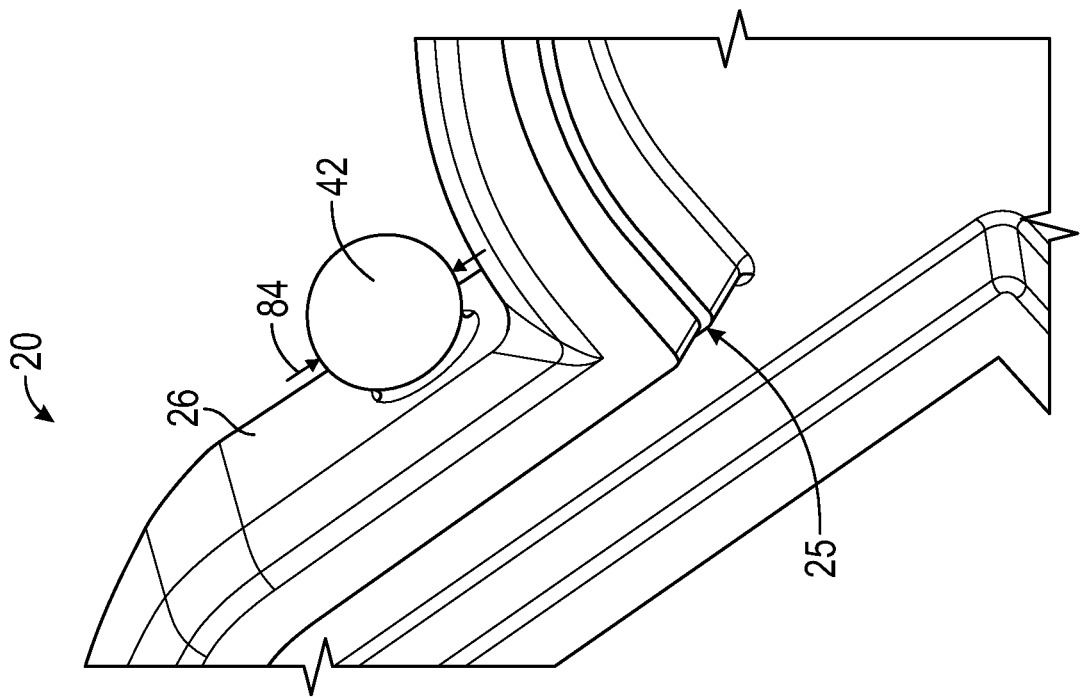
FIG. 13 is an enlarged view of the example attachment ball of birthday cake shaped pancake mold.
Figure 12:
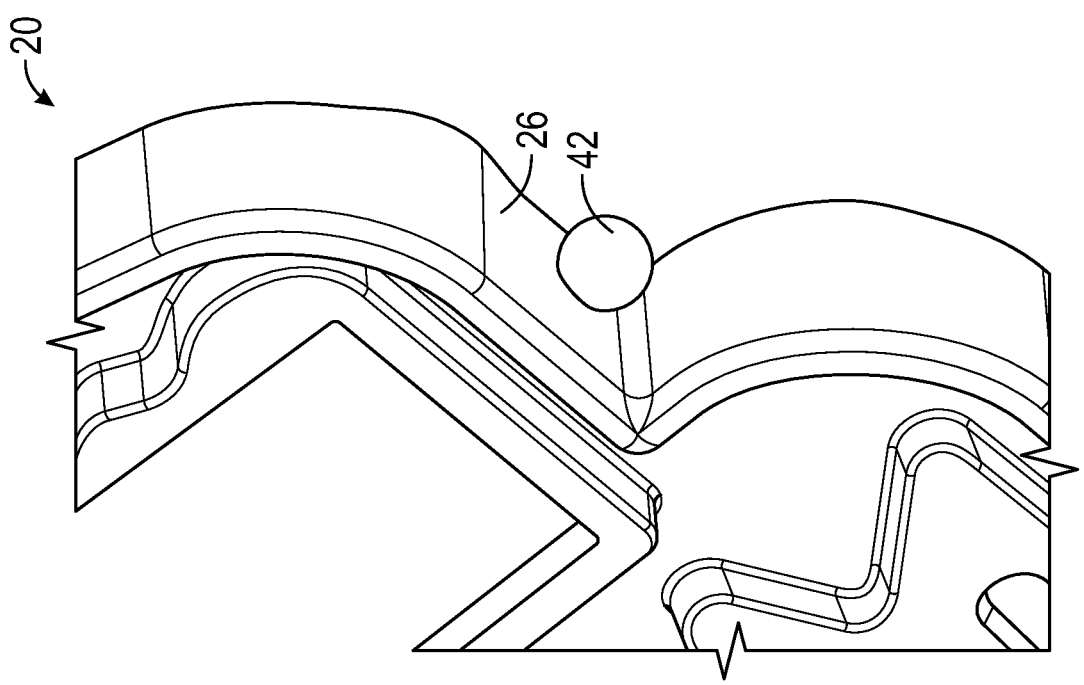
FIG. 12 is a perspective view of an attachment ball of the birthday cake shaped pancake mold.

Referring to FIGS. 12 and 13 the ball 42 is shown in enlarged views. The ball 42 is a spherical projection that extends from the peripheral wall 26. The spherical projection is not a complete sphere in that the side immediately at the peripheral wall 26 is a flat surface and does not come to a point. A maximum diameter or width 84 is greater than the size of the opening 54 in the rope 40. Accordingly, stretching of the opening 54 past the maximum diameter 84 and against the peripheral wall 26 holds the rope 40 in place. Removal is performed by again stretching the opening 54 in the rope 40 over the ball 42.

The opening 54 (FIG. 5) and the ball 42 are round and spherical, respectively, but may be other shapes within the contemplation and scope of this disclosure. The ball 42 may be replaced other shapes that enable holding of the rope 40. Moreover, the opening 54 need not be round, but may be other shapes determined to hold the rope 40 in place.

Figure 14:
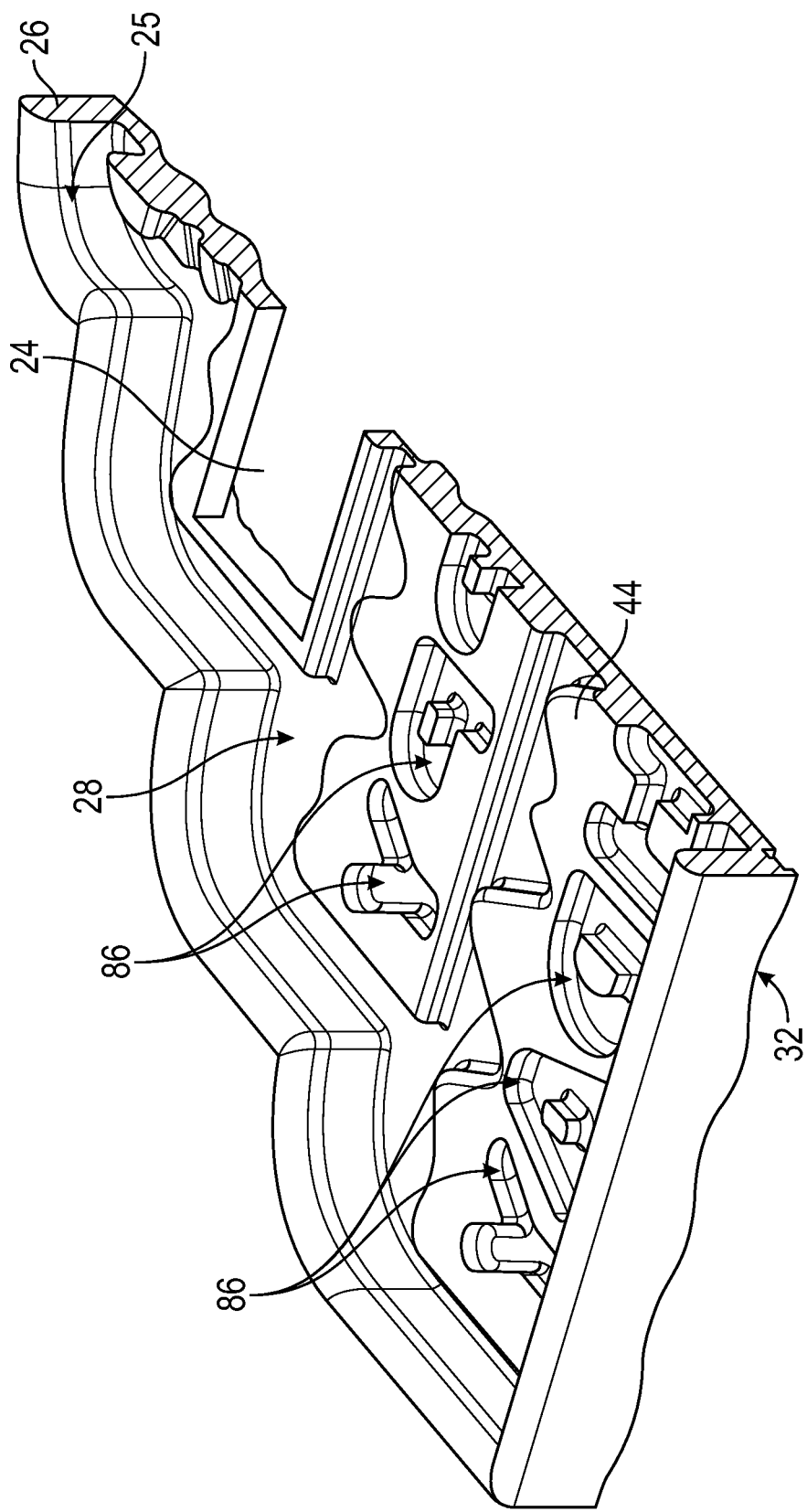
FIG. 14 is sectional view of the example birthday cake shaped pancake mold.

Referring to FIG. 14, the mold 20 is shown in a cutaway view to illustrate the raised portions 44 and the base surface 28. The example base surface 28 is smooth to provide a desired smooth front and visible surface on a completed pancake. The raised portions 44 include the impressions 86 that fill with batter to provide raised letters in the completed pancake. As appreciated, the impressions 86 and raised portions 44 may be reversed to provide the desired character, design and/or saying as depressions in the completed pancake. Moreover, different combinations of raised portions and impressions 86 could be utilized within the contemplation and scope of this disclosure.

Figure 15:
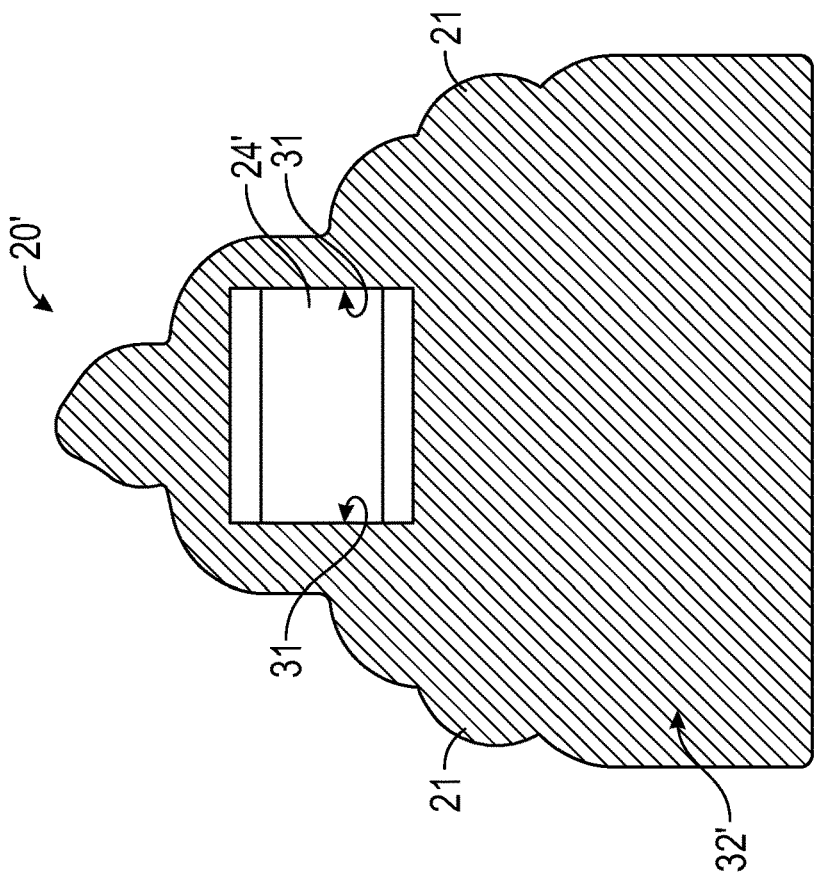
FIG. 15 is a front view of another example birthday cake shaped pancake mold embodiment.
Figure 16:
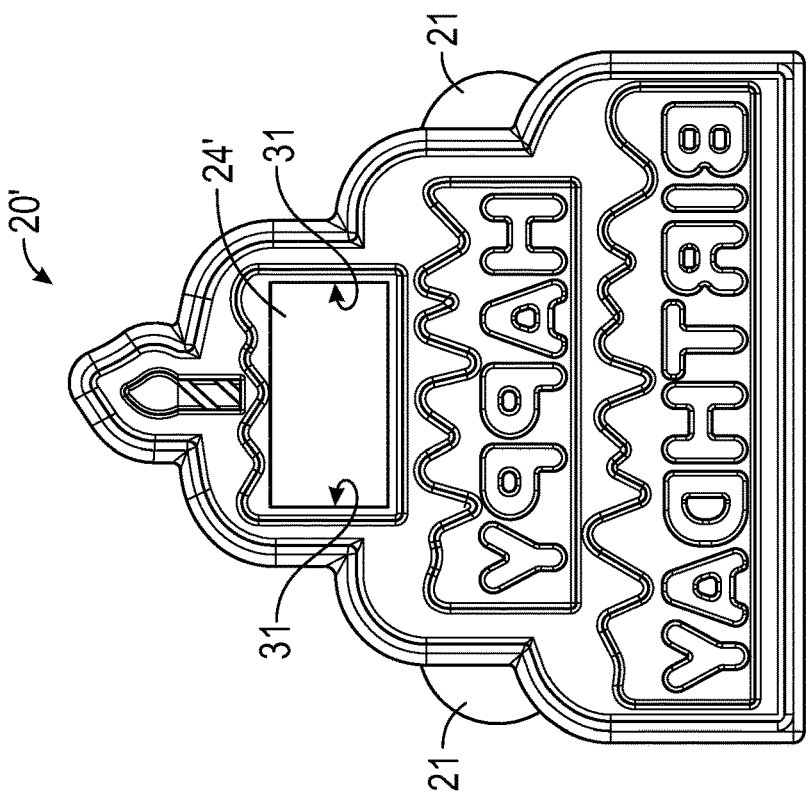
FIG. 16 is a back view of the example birthday cake shaped pancake mold embodiment.

Referring to FIGS. 15 and 16, another example mold 20' is shown and includes tabs 21 to aid in lifting the mold from a cooking surface. The example mold 20' does not include ball 42 nor the provisions for a rope. Other features of the example mold 20' are as described above with regard to the mold 20. The mold 20' includes an opening 24' for tiles. A back surface 32' is flat without grooves or any texturing. As appreciated, the either of the disclosed example molds 20, 20' may include a flat back surface as indicated at 32' in FIG. 16 or a textured back surface indicated at 32 in FIG. 4.

In this disclosed example, the tabs 21 are flush with the back surface 32'. However, the tabs 21 may be set apart from the back surface or at any location along the outer wall of the mold 20'.

Because tiles are not held in by the previously disclosed and described rope and ball, the back side does not include a channel or groove to receive a rope. Moreover, the outer wall does not include the ball.

Referring to FIGS. 17, 18 and 19, another example tile 36' is shown that includes raised portions 35 on either side. The raised portions 35 fit within depressions 37 formed in side walls 31 of the opening 24'. The tiles 36' click into the opening and the raised portions 35 fit within the depressions 37 of the side walls 31. The fit between the raised portions 35 and the depressions 37 hold the tile 36' in place during use.

Referring to FIG. 20, another tile 36" is shown without any groove, raised portion or tabs 68 as are provided in the previously described and disclosed tiles 36, 36'. The tile 36" is held in place by a tight fit provided between the tile 36" and the opening 24'. The tile 36 includes a height 39 and width 41 that are sized to provide a light interference fit that maintains the tile 36" in place during use. As appreciated, several example tile holding features have been disclosed by way of example and other tile holding means are within the scope and contemplation of this disclosure.

Figure 22:
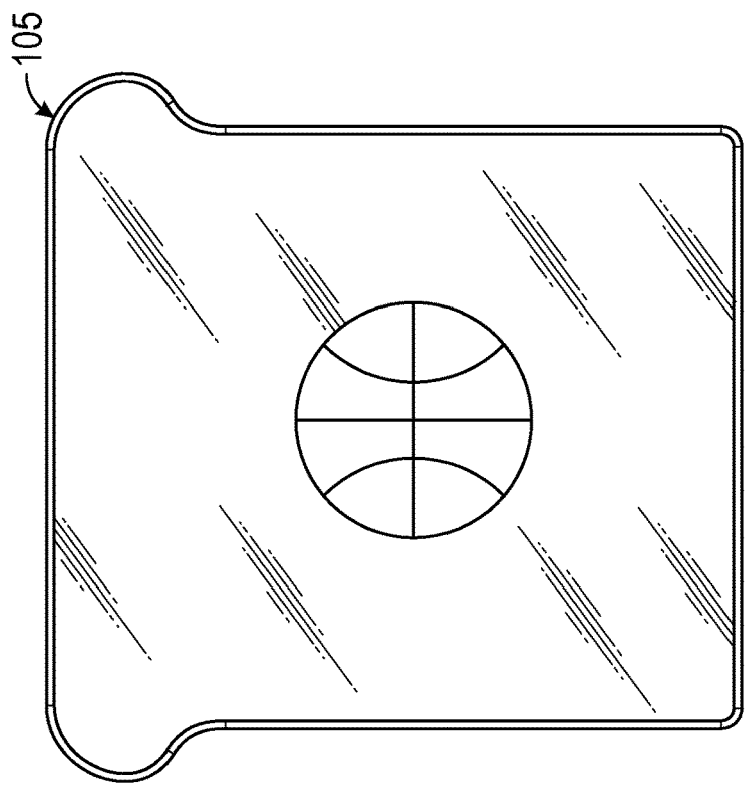
FIG. 22 is a front view of a toasted piece of bread with a design imprint formed by the example toast mold assembly.
Figure 21:
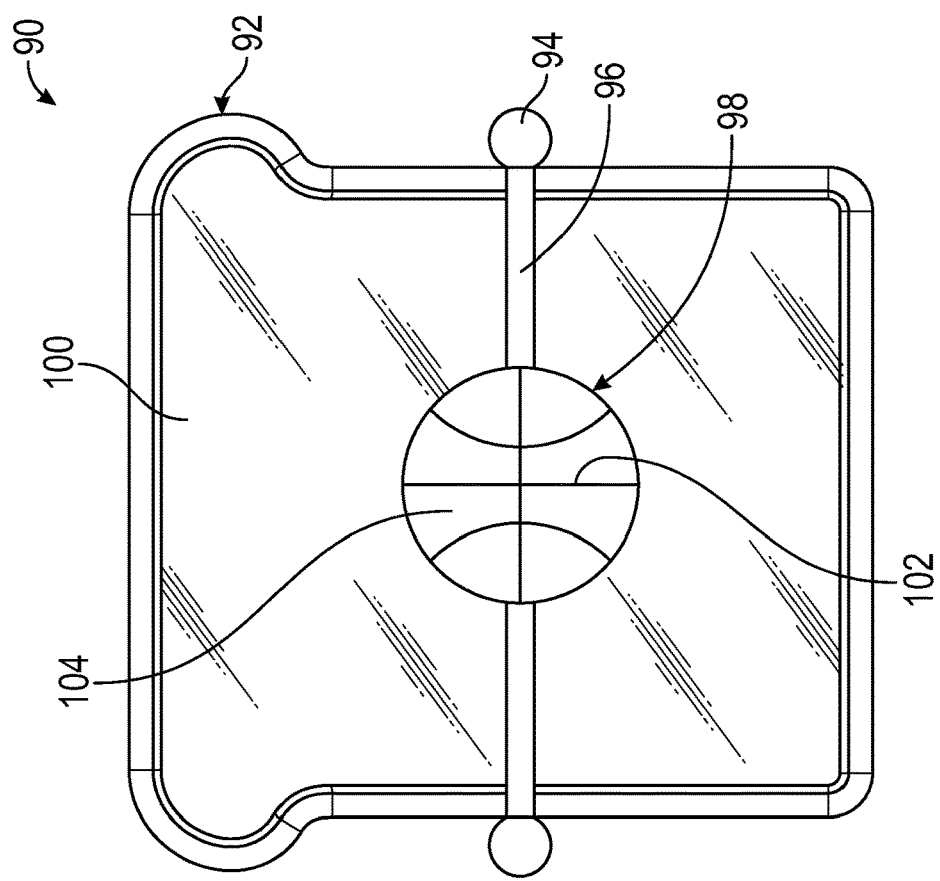
FIG. 21 is a front view of an example toast mold assembly.

Referring to FIGS. 21 and 22, a toast mold 90 according to another embodiment of this disclosure is shown. The toast mold 90 includes an outer wall 92 that is shaped to accept a single piece of bread 100. The outer wall 92 surrounds a perimeter of the bread 100. A front side and back side of the toast mold 90 are open to enable heat to be applied to each side of the bread 100. A rope 96 is attached to balls 94 on sides of the outer wall 92 and over one side of the bread 100 to position a design 98 over the bread 100. The design 98 includes a shape with open parts 102 and sold parts 104. The solid parts 104 of the design 98 locally block heat from radiating to the bread 100. The open areas 102 allow heat to radiate to the bread 100. The resulting piece of toast 105 (FIG. 16) thereby includes lighter and darker portions that form the shape of the design 98. In this example, the design is a basketball, however other designs may be utilized and are within the scope of this disclosure.

The design 98 and the rope 96 is shown as an integral part, but may be separate parts. The design 98 may also be numbers, letters, sayings, names or any other character and combination desired to reflected and shown on a completed toasted item.

The example toast mold 90 maybe of a thickness that enables insertion into a toaster. Moreover, although a piece of bread 100 is shown, the toast mold 100 could be shaped for other food items that are toasted such as bagels, English muffins or other food items commonly toasted.

Mold for making uniquely shaped and imprinted foods have been disclosed by way of example for a pancake mold and a toast mold. However, the disclosures herein are also applicable to other prepared foods including cake molds, jello molds, waffle molds, baking molds, egg molds, cupcake molds, candy molds and/or chocolate molds and are within the contemplation of this disclosure.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A food preparation mold assembly comprising:
   a main body portion defining at least one character opening and a shape of completed food item, wherein the main body includes a base surface within an outer peripheral wall and the base surface includes a front face, a back face and the at least character opening through the base surface, wherein the front face and the character face include raised portions configured to imprint a symbol on a surface the completed food item; and
   at least one character tile configured to fit within the at least one character opening, the at least one character tile including a character face configured to define a portion of the front face and the completed food item.

2. The cooking mold assembly as recited in claim 1, further comprising an attachment member configured for attachment to the main body for securing the at least one character tile within the character opening.

3. The cooking mold assembly as recited in claim 1, wherein the raised portions on the front face are a mirror image of the symbol imprinted on the surface of the completed food item.

4. The cooking mold as recited in claim 3, wherein the main body includes an outer peripheral wall and the front face comprises a base surface within the outer peripheral wall.

5. The cooking mold as recited in claim 4, wherein the outer peripheral wall is configured to contain a food that forms the completed food item.

6. The cooking mold as recited in claim 1, wherein the character face is shaped to form an alphanumeric symbol on a completed food item.

7. The cooking mold as recited in claim 1, wherein the at least one character opening comprises one character opening and the at least one character tile comprises a plurality of character tiles sized to fit within the one character opening.

8. The cooking mold as recited in claim 7, wherein the at least one character opening comprises one character opening.

9. The cooking mold as recited in claim 1, wherein the main body portion and the at least one character tile are formed from a silicon material.

10. A food preparation mold assembly comprising:
a main body portion defining at least one character opening and a shape of completed food item, wherein the main body includes a base surface within an outer peripheral wall and the base surface includes a front face, a back face and the at least character opening through the base surface, wherein the back face includes a textured surface; and
at least one character tile configured to fit within the at least one character opening, the at least one character tile including a character face configured to define a portion of the front face and the completed food item.

11. A food preparation mold assembly comprising:
a main body portion including an outer peripheral wall, a back face and at least one character opening, the outer peripheral wall configured to define a shape of completed food item, wherein the back face includes a textured surface; and
at least one character tile configured to fit within the at least one character opening, the at least one character tile including a front face configured to define a character in the completed food item.

12. The cooking mold assembly as recited in claim 11, wherein the textured surface comprises a series of rib.

13. The cooking mold assembly as recited in claim 12, wherein the main body includes a front face, the front face including raised portions configured to imprint a symbol on a surface of the completed food item, wherein the raised portions on the front face are a mirror image of the symbol imprinted on a surface of the completed food item.

14. The cooking mold as recited in claim 11, wherein the main body portion and the at least one character tile are formed from a flexible silicon material.

* * * * *